United States Patent
McCoy

(10) Patent No.: US 8,363,540 B2
(45) Date of Patent: *Jan. 29, 2013

(54) PILOT SIGNAL IN AN FDMA COMMUNICATION SYSTEM

(75) Inventor: James W. McCoy, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/210,240

(22) Filed: Aug. 15, 2011

(65) Prior Publication Data

US 2011/0299380 A1 Dec. 8, 2011

Related U.S. Application Data

(62) Division of application No. 12/806,944, filed on Aug. 24, 2010, now Pat. No. 8,000,228, which is a division of application No. 11/334,606, filed on Jan. 18, 2006, now Pat. No. 7,808,886.

(51) Int. Cl.
*H04J 11/00* (2006.01)
*H04J 3/02* (2006.01)
*G06F 15/00* (2006.01)
*G06F 17/15* (2006.01)
*H04B 7/204* (2006.01)
*H04B 17/00* (2006.01)

(52) U.S. Cl. ........ 370/210; 370/208; 370/537; 370/319; 455/67.16; 708/403; 708/404; 708/421

(58) Field of Classification Search .......... 370/203, 370/208, 210, 319, 334, 528, 529, 537; 455/450, 455/452.1, 67.16; 375/260, 261, 265; 708/400, 708/402–405, 421, 426

See application file for complete search history.

(56) References Cited

U.S. PATENT DOCUMENTS

| | | | |
|---|---|---|---|
| 6,937,558 | B2 | 8/2005 | Wakutsu |
| 7,808,886 | B2 * | 10/2010 | McCoy .......................... 370/210 |
| 2004/0240569 | A1 | 12/2004 | Rudowicz et al. |
| 2005/0099939 | A1 | 5/2005 | Huh et al. |
| 2005/0157801 | A1 | 7/2005 | Gore et al. |
| 2007/0004465 | A1 | 1/2007 | Papasakellariou et al. |
| 2007/0041311 | A1 | 2/2007 | Baum et al. |
| 2007/0041404 | A1 | 2/2007 | Palanki et al. |
| 2007/0183386 | A1 | 8/2007 | Muharemovic et al. |
| 2010/0111044 | A1 | 5/2010 | Kawamura et al. |

OTHER PUBLICATIONS

Texas Instruments, Uplink Pilot in EUTRA SC-FDMA, San diego, USA. R-051062. Oct. 10, 2005.
Popovic: Generalized Chirp-Like Polyphase Sequences With Optimum Correlation Properties; IEEE, vol. 38, No. 4 Jul. 1992. pp. 1406-1409.
On Allocation of Uplink Pilot Sub-Channels in EUTRA SC-FDMA; TX Instruments; London, UK; Aug. 29-Sep. 2, 2005 R1-050822.

(Continued)

*Primary Examiner* — Christopher M Brandt
(74) *Attorney, Agent, or Firm* — Gazdzinski & Associates, PC

(57) ABSTRACT

A method for generating a transmit sequence in a single carrier frequency division multiple access (SC-FDMA) transmitter is disclosed. In one embodiment, the method includes generating a first time domain sequence, transforming the first time domain sequence to a first frequency domain sequence according to a first transform, distributing the first frequency domain sequence among a subset of subcarriers among a plurality of subcarriers in a second frequency domain sequence, transforming the second frequency domain sequence to a second time domain sequence, and adding a cyclic prefix to the second time domain sequence to form a transmit sequence. In one exemplary embodiment, the first time domain sequence is a plurality of pilot symbols that have known properties e.g., a constant amplitude, and zero autocorrelation (CAZAC).

31 Claims, 5 Drawing Sheets

OTHER PUBLICATIONS

On Uplink Pilot in EUTRA SC-FDMA; TX Instruments; Sandiego, USA:Oct. 10-14, 2005: R1-051062.

Consideration on SC-FDMA Pilot Design: Freescale Semiconductor; Seoul Korea; Nov. 7-11, 2005: Tdoc R1-051370.

Consideration on SC-FDMA Pilot Design; Freescale Semiconductor: Seoul Korea; Nov. 7-11, 2005; Tdoc R1-051557.

EUTRA SC-FDMA Uplink Pilot/Reference Signal Design & TP: Motorola: Athens Greece; Mar. 27-31, 2006 R1-060878 p. 1-5.

* cited by examiner

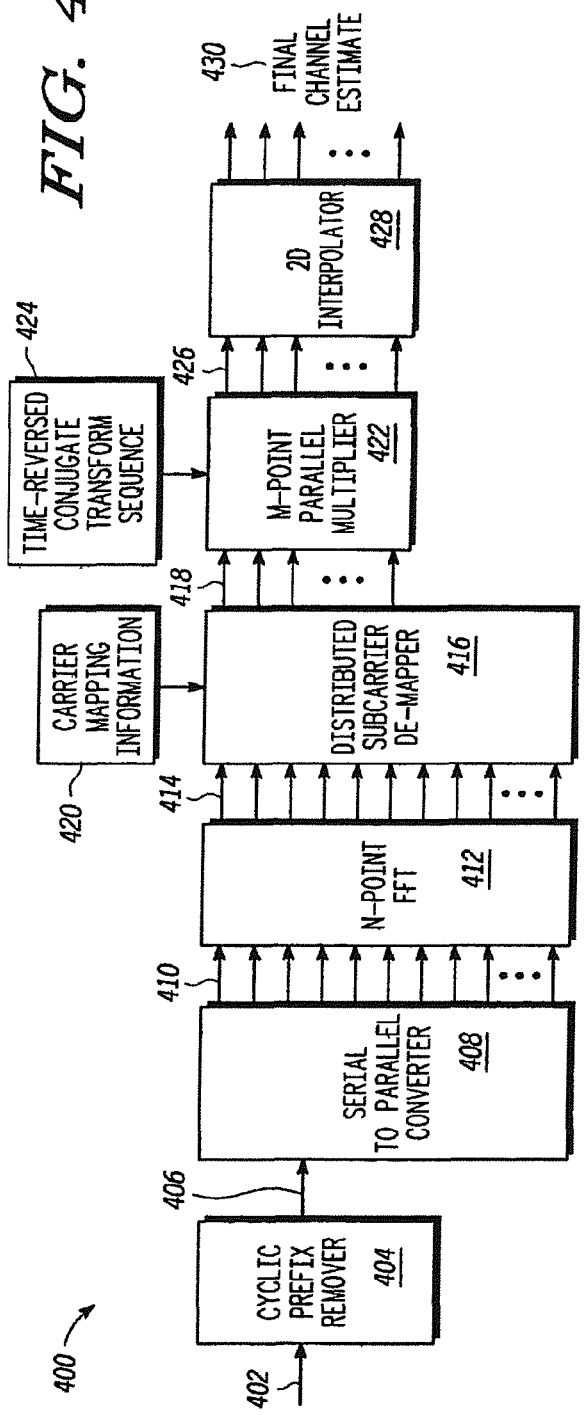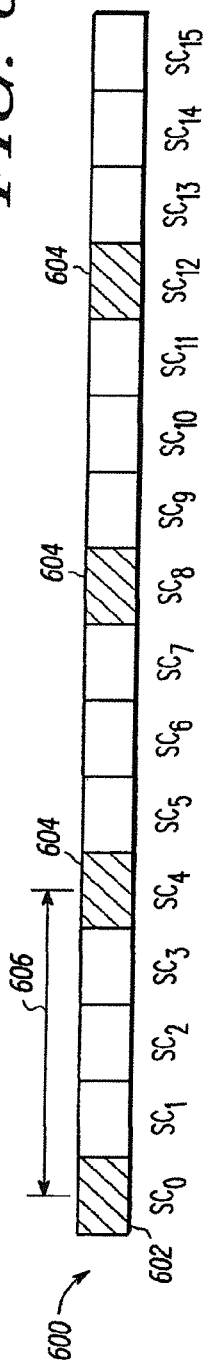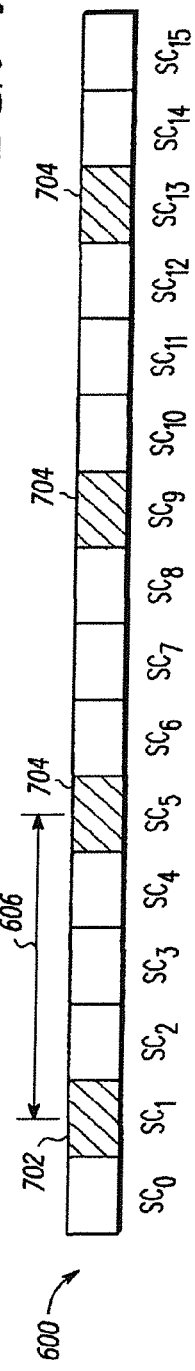

PILOT SIGNAL IN AN FDMA COMMUNICATION SYSTEM

PRIORITY AND RELATED APPLICATIONS

This application is a divisional of co-owned U.S. patent application Ser. No. 12/806,944 of the same title filed Aug. 24, 2010 (now issued as U.S. Pat. No. 8,000,228), which is a divisional of and claims priority to U.S. patent application Ser. No. 11/334,606 of the same title tiled Jan. 18, 2006 (now issued as U.S. Pat. No. 7,808,886), each of the foregoing incorporated herein by reference in its entirety.

This application is also related to co-owned and co-pending U.S. patent application Ser. No. 13/210,251 of the same title filed contemporaneously herewith on Aug. 15, 2011.

FIELD OF THE INVENTION

This invention relates in general to communication systems using a carrier comprising multiple sub-carriers, and more specifically to techniques and apparatus for generating and using a pilot signal in a multi-carrier communication system.

BACKGROUND OF THE INVENTION

Multicarrier modulation systems divide the transmitted bitstream into many different substreams and send these over many different subchannels. Typically the subchannels are orthogonal under ideal propagation conditions. The data rate on each of the subchannels is much less than the total data rate, and the corresponding subchannel bandwidth is much less than the total system bandwidth. The number of substreams is chosen to ensure that each subchannel has a bandwidth less than the coherence bandwidth of the channel, so the subchannels experience relatively flat fading. This makes the inter symbol interference (ISI) on each subchannel small.

In more complex systems, which are commonly called orthogonal frequency division multiplexing (OFDM) systems (or multi-carrier or discrete multi-tone modulation systems), data is distributed over a large number of carriers that are spaced apart at precise frequencies. The frequency spacing provides the "orthogonality," which prevents the demodulators from seeing frequencies other than their own. The benefits of OFDM are high spectral efficiency, resiliency to RF interference, and lower multi-path distortion. This is useful because in a typical terrestrial broadcasting scenario there are multipath-channels (i.e. the transmitted signal arrives at the receiver using various paths of different length). Since multiple versions of the signal interfere with each other through inter symbol interference (ISI), it becomes very hard for the receiver to extract the originally transmitted data.

In an OFDM system, data must be coherently demodulated. Therefore, it is necessary to know the amplitude and phase of the channel in the receiver. A pilot signal is transmitted with the data so that the receiver can determine the amplitude and phase of the channel. The pilot signal also allows the receiver to measure the transfer characteristics of the channel between the transmitter and receiver through a process known as "channel estimation."

BRIEF DESCRIPTION OF THE DRAWINGS

The accompanying figures, wherein like reference numerals refer to identical or functionally similar elements throughout the separate views and which together with the detailed description below are incorporated in and form part of the specification, serve to further illustrate various embodiments and to explain various principles and advantages, all in accordance with the present invention.

FIG. 4 depicts a more detailed high-level representative block diagram of portions of the SC-SDMA receiver of FIG. 2 in accordance with one or more embodiments;

FIGS. 6 and 7 show, in representative form, distributions of pilot signal information to sets of subcarriers in accordance with one or more embodiments;

DETAILED DESCRIPTION

In overview, the present disclosure concerns a pilot signal to be used for estimating the transfer characteristics of a communication channel in a communication system. More particularly various inventive concepts and principles embodied in methods and apparatus may be used for generating a pilot signal for transmitting with a data signal in a communications system, and for demodulating the pilot signal in a receiver in the communication system.

While the pilot signal (generator/demodulator) of particular interest may vary widely, one embodiment may advantageously be used in a wireless cellular communications system having a transmitter and receiver using a single carrier frequency division multiple access (SC-FDMA) modulation scheme. However, the inventive concepts and principles taught herein may be advantageously applied to other broadband communications systems having multiplexed communication links transmitted in other media.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims, including any amendments made during the pendency of this application, and all equivalents of those claims as issued.

It is further understood that the use of relational terms, if any, such as first and second, top and bottom, and the like, are used solely to distinguish one entity or action from another without necessarily requiring or implying any actual such relationship or order between such entities or actions.

Much of the inventive functionality and many of the inventive principles are best implemented with, or in, integrated circuits (ICs), including possibly application specific ICs, or ICs with integrated processing controlled by embedded software or firmware. It is expected that one of ordinary skill—notwithstanding possibly significant effort and many design choices motivated by, for example, available time, current technology, and economic considerations—when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts of the various embodiments.

Figure 1:
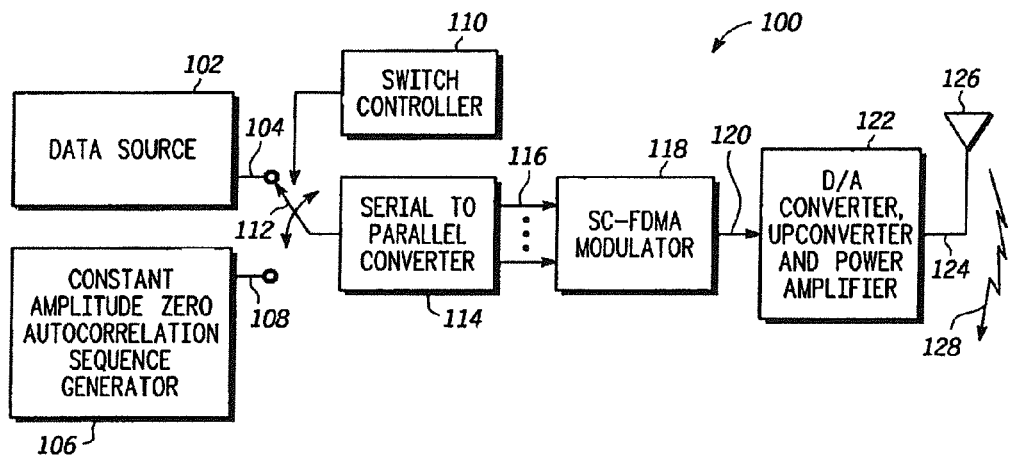
FIG. 1 depicts, in a simplified and representative form, a high-level block diagram of portions of a single carrier frequency division multiple access (SC-FDMA) transmitter for use in a data communications system in accordance with one or more embodiments.

Referring to FIG. 1, a high-level diagram of portions of a single carrier frequency division multiple access (SC-FDMA) transmitter for use in a data communications system in accordance with one or more embodiments will be briefly discussed and described. In FIG. 1, SC-FDMA transmitter 100 includes data source 102, which generates a data sequence 104 that is traffic data or user data generated by, for example, an application running in a subscriber unit of a cellular communications system, or perhaps by the transmission of streaming media, or by transferring a file, or other similar processes that transfer data.

Because the transmitted signal will be coherently demodulated in a receiver, it is necessary to know the amplitude and phase of the channel in the receiver. A pilot signal is transmitted with the data so that the receiver can determine the amplitude and phase of the channel. The pilot signal also allows the receiver to measure the transfer characteristics of the channel between the transmitter and receiver through a process known as "channel estimation."

As shown in FIG. 1, pilot sequence generator 106 generates a pilot sequence 108 that can be alternately and periodically transmitted with traffic data 104 from data source 102. The pilot sequence 108 comprises a known data sequence having known characteristics. The characteristics of pilot sequence 108 are: (1) a constant magnitude; (2) zero circular autocorrelation; (3) a flat frequency domain response; and (4) a circular cross-correlation between two sequences that is low and has a constant magnitude, provided that the sequence length is a prime number.

One sequence that has these properties is known as a Zadoff-Chu, Frank-Zadoff, and Milewski sequence, which is also known as a constant-amplitude zero-autocorrelation (CAZAC) sequence. The CAZAC sequence is defined as follows: Let L be any positive integer, and let k be any number which is relatively prime with L. Then the n-th entry of the k-th Zadoff-Chu CAZAC sequence is given as follows:

$$c_k(n) = \exp\left[\frac{j2\pi k}{L}\left(n + n\frac{n+1}{2}\right)\right] \quad \text{if } L \text{ is odd}$$

$$c_k(n) = \exp\left[\frac{j2\pi k}{L}\left(n + \frac{n^2}{2}\right)\right] \quad \text{if } L \text{ is even}$$

where n ranges from 0 to L−1.

The CAZAC sequence is a special subset of polyphase Chirp sequences, such as the Generalized Chirp Like (GCL) sequences. Note that the "constant-amplitude zero-autocorrelation" property of the CAZAC sequence is preserved as the sequence is transformed to and from the time and frequency domains. Thus, the CAZAC sequence has benefits for the radio frequency power amplifier because transmission using SC-FDMA techniques provides a signal with a low peak-to-average power ratio in the time domain. Additionally, the CAZAC sequence aids channel estimation because the signal has a constant amplitude in the frequency domain.

Switch controller 110 controls switch 112, which alternates between selecting data sequence 104 and pilot sequence 108. In one embodiment, switch controller 110 allows 6 symbols of data sequence 104 for every 2 pilot sequences 108. Other ratios of data and pilot sequences may be used.

After being selected by a switch 112, pilot sequence 108 is coupled to serial-to-parallel converter 114. Serial-to-parallel converter 114 receives a serial stream of data and converts it to a parallel data output. If pilot sequence 108 is received, serial-to-parallel converter 114 converts it to an M-point parallel CAZAC sequence 116, where M is the number of complex valued samples in the sequence.

Figure 3:
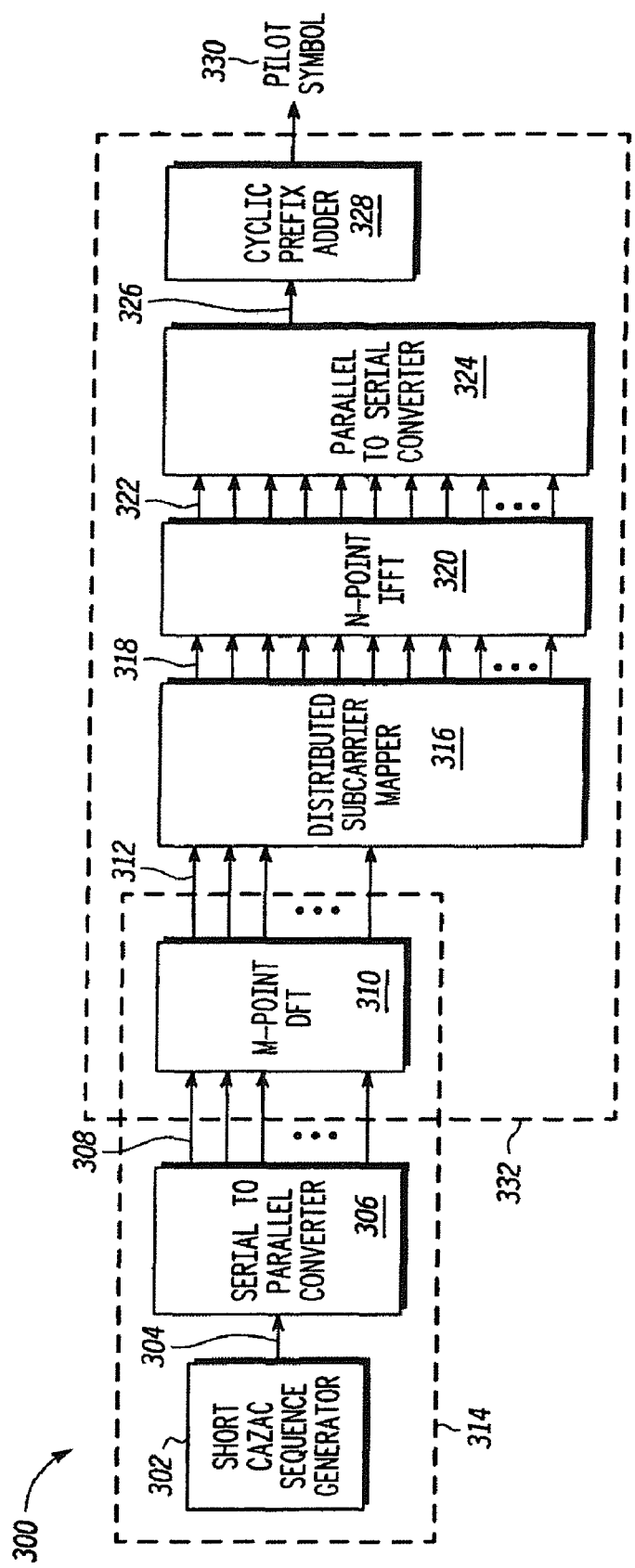
FIG. 3 depicts a more detailed high-level representative block diagram of portions of the SC-SDMA transmitter of FIG. 1 in accordance with one or more embodiments.

The M-point parallel output of serial-to-parallel converter 114 is coupled to the input of single-carrier frequency division multiple access (SC-FDMA) modulator 118. SC-FDMA modulator 118 is a multi-carrier modulation block that uses digital mathematical techniques to generate the orthogonal carriers required for OFDM transmission. The output of SC-FDMA modulator 118 is a digital baseband representation of an OFDM modulated pilot symbol 120. A more detailed view of the digital processing system of data transmitter 100 is shown in FIG. 3, discussed below.

The OFDM modulated pilot symbol 120 is coupled to transmitter block 122. Within transmitter block 122, the digital signal is converted to an analog signal by a digital-to-analog (D/A) converter. The analog signal is then coupled to an upconverter, and a power amplifier, to produce amplified radio frequency signal 124. Radio frequency signal 124 is coupled to antenna 126 for transmitting transmitted radio signal 128. Transmitted radio signal 128 is affected by the environment according to the characteristics of the channel, and thus signal 128 becomes a "received" signal at the receiver.

Figure 2:
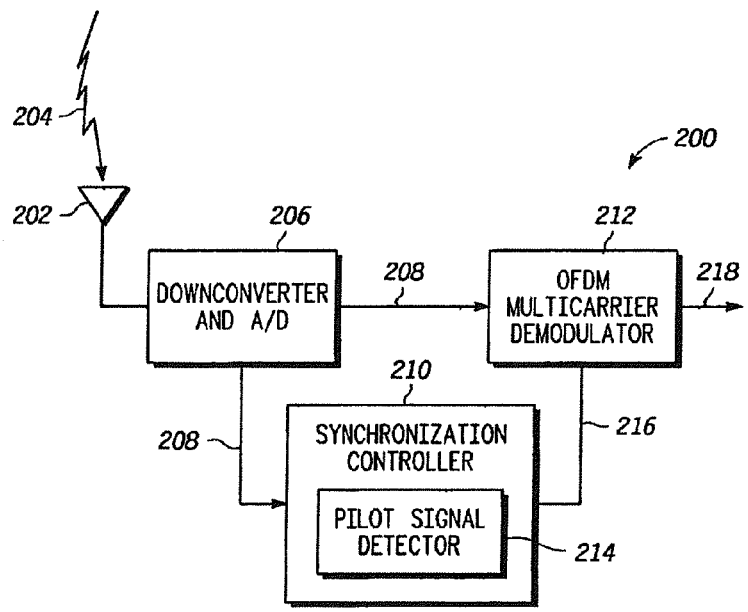
FIG. 2 shows, in a representative form, a high-level block diagram of portions of an SC-FDMA receiver used to receive data transmitted by the transmitter of FIG. 1 in accordance with one or more embodiments.

Referring to FIG. 2, there is depicted a representative block diagram of a receiver that illustrates functional blocks for receiving, demodulating, and using a pilot signal in accordance with one or more embodiments. As shown, receiver 200 includes antenna 202 for receiving received signal 204. Antenna 202 is coupled to downconverter and analog-to-digital (A/D) converter 206, which removes the radio frequency carrier from received signal 204 and converts the analog signal to a serial stream of digital samples 208.

Digital samples 208 from downconverter and A/D converter 206 are coupled to synchronization controller 210 and OFDM multi-carrier demodulator 212. Synchronization controller 210 monitors digital samples 208 to detect a pilot signal using pilot signal detector 214. The purpose of synchronization controller 210 is to recover a reference signal (e.g., a pilot signal), which is a known signal that provides symbol timing or synchronization information, and which also allows channel estimation and the calculation of channel equalization coefficients. Such synchronization and channel estimation information 216 is coupled to OFDM multi-carrier demodulator 212 so that demodulator 212 may be precisely synchronized in order to demodulate the OFDM signal represented by digital samples 208. OFDM multi-carrier demodulator 212 provides, at its output, traffic data or user data 218, which is data carried in received signal 204. Functions similar to those within OFDM multi-carrier demodulator 212 may be used within synchronization controller 210 to receive and demodulate pilot symbols.

With reference now to FIG. 3, there is depicted a more detailed representative diagram of portions 300 of transmitter 100 (see FIG. 1) for generating a pilot symbol in accordance with one or more embodiments. As illustrated in FIG. 3, a serial pilot sequence 304 is generated in short CAZAC sequence generator 302. In one embodiment, the sequence is M complex samples in length, wherein M is equal to, for example, 37.

The CAZAC sequence generated by CAZAC sequence generator 302 is referred to as "short" sequence because the length of the sequence is shorter than the number of available subcarriers. For example, if there are 301 available subcarriers, a long CAZAC sequence would occupy all of them, and a short CAZAC sequence may only occupy, for example, 37 of them. As noted above, the "constant-amplitude zero-autocorrelation" property of the CAZAC sequence is preserved in both the time and frequency domains.

The output of short CAZAC sequence generator 302 is coupled to serial-to-parallel converter 306, which converts serial pilot sequence 304 into an M-point parallel CAZAC sequence 308. M-point parallel CAZAC sequence 308 is coupled to an input of M-point is discrete Fourier transformer (DFT) 310. M-point DFT 310 analyzes the frequency components of the M-points of serial pilot sequence 304, and converts serial pilot sequence 304 into the frequency domain to output an M-point parallel transform sequence 312.

Note that in some embodiments, M-point parallel transform sequence 312 may be recalled from transform memory 314. Thus, rather than generating sequences and calculating discrete Fourier transforms (i.e. real-time synthesis), the system and process may recall a pre-calculated M-point parallel transform sequence 312 from a data storage device using a table look up technique.

M-point parallel transform sequence 312 is coupled to the input of distributed subcarrier mapper 316, which is used to distribute the M-point parallel transform sequence 312 to a set of M subcarriers among N subcarriers to form an N-point frequency-domain sequence 318, where N is greater than M and wherein the M subcarriers are evenly spaced apart among the N subcarriers. N is the number of subcarriers used in the SC-FDMA transmitted signal. In one embodiment, N is equal to 512, and N maybe larger or smaller in alternative embodiments. Outputs 318 of distributed subcarrier mapper 316 that are not mapped to one of the M-point parallel transform sequence 312 values are set to a zero value.

Referring again to the output of distributed subcarrier mapper 316, N-point frequency-domain sequence 318 is coupled to N-point inverse fast Fourier transformer (IFFT) 320. N-point IFFT 320 converts N-point frequency-domain sequence 318 into N-point time-domain sequence 322. The inverse fast Fourier transform is an efficient mathematical algorithm for reversing a fast Fourier transform. N-point time-domain sequence 322 is coupled to an input of parallel-to-serial converter 324, which converts the parallel data into serial sequence 326.

Serial sequence 326 is coupled to an input of cyclic prefix adder 328. Cyclic prefix adder 328 copies a predetermined number of complex samples from the end of serial sequence 326 and places those samples at the beginning of serial sequence 326. In one embodiment, the number of samples copied is 32. The purpose of adding a cyclic prefix is to ensure orthogonality, which prevents one subcarrier from interfering with another (which is called intercarrier interference, or ICI). The output of cyclic prefix headers 328 is pilot symbol 330.

Note that the functional blocks within dashed box 322 may be referred to as an SC-FDMA modulator, such as SC-FDMA modulator 118 in FIG. 1. Also note that in other embodiments, the order of functional blocks parallel-to-serial converter 324 and cyclic prefix adder 328 may be reversed so that the cyclic prefix is added before converting the data to a serial stream.

Turning now to FIG. 4, there is depicted a more detailed high-level representative block diagram of portions 400 of the SC-SDMA receiver 200 of FIG. 2 in accordance with one or more embodiments. As illustrated, received waveform 402, which is a baseband digital stream similar to digital samples 208 in FIG. 2, is coupled to the input of cyclic prefix remover 404. Cyclic prefix remover 404 removes the cyclic prefix from the beginning of the digital samples to produce modified pilot waveform 406.

Modified pilot waveform 406 is coupled to an input of serial-two-parallel converter 408. The output of serial-to-parallel converter 408 is N-point parallel modified pilot symbol 410, which is coupled to an input of N-point fast Fourier transformer (FFT) 412.

N-point FFT 412 produces received transformed pilot symbol 414 at its output, as it converts the pilot signal from the time domain to the frequency domain.

Received transformed pilot symbol 414 is coupled to an input of distributed subcarrier de-mapper 416. Distributed subcarrier de-mapper 416 de-maps the M distributed subcarriers in the received transformed pilot symbol to produce an M-point received signal 418. Distributed subcarrier demapper 416 uses carrier mapping information 420 to perform the demapping function.

Carrier mapping information 420 describes the selected set of M subcarriers (i.e., the locations of the subcarriers containing pilot information within the N received subcarriers). Carrier mapping information 420 is known in the receiver before receiving received waveform 402. Such carrier mapping information can be agreed upon according to a standard describing the data communication interface, or it can be transmitted in a control message the to the receiver before it is needed.

M-point received signal 418 is coupled to the input of M-point parallel multiplier 422. M-point parallel multiplier 422 multiplies received signal 418 by M-point channel estimate multiplier 424 to produce an M-point intermediate channel estimate 426. M-point channel estimate multiplier or sequence 424 is, in one or more embodiments, a Fourier transformed time-reversed conjugate sequence derived from serial pilot sequence 302 (see FIG. 3). The net effect of the transformation of, and multiplication by, the pilot sequence is that the frequency domain equivalent of a time domain circular correlation with the pilot sequence is performed Following M-point parallel multiplier 422, M-point intermediate channel estimate 426 is coupled to two dimensional (2D) interpolator 428. The output of 2D interpolator 428 is final channel estimate 430. The final channel estimate gives the channel estimate at the location of each assigned data carrier.

Figure 5:
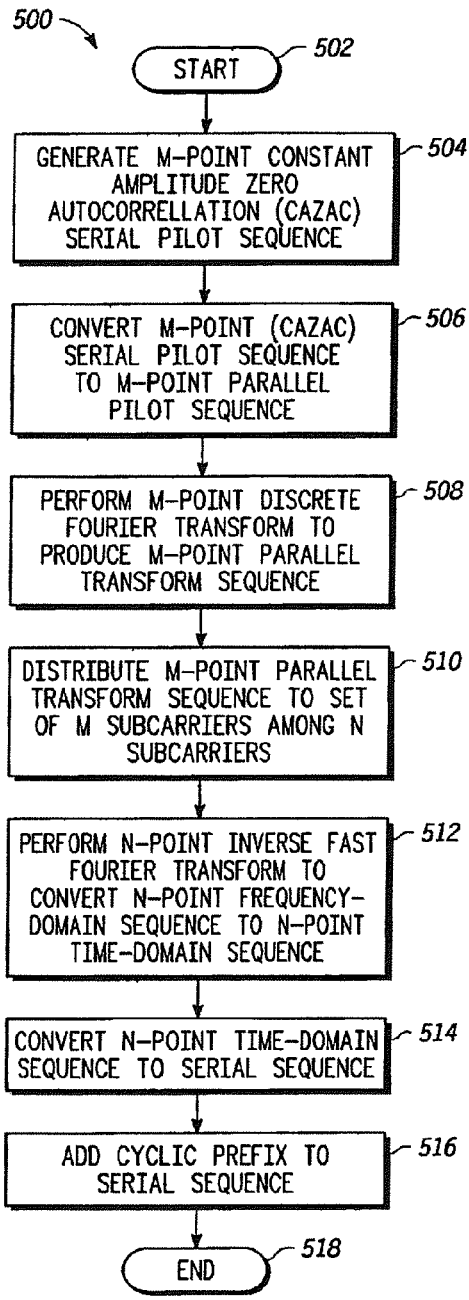
FIG. 5 is a high-level flowchart of processes executed by the SC-SDMA transmitter of FIGS. 1 and 3 in accordance with one or more embodiments.

Referring now to FIG. 5, there is depicted a high-level flowchart 500 of exemplary processes executed by portions of a transmitter, such as transmitter 100, which is shown in the system of FIGS. 1 and 3, or other similar apparatus, in accordance with one or more embodiments. As illustrated, the process begins at block 502, and thereafter passes to block 504 wherein the process generates a short M-point constant-amplitude zero autocorrelation (CAZAC) serial pilot sequence, wherein M is an integer representing the number of complex samples in the sequence. M is also referred to as a short sequence because M is significantly less than a number of carriers used when mapping transmitted data symbols on subcarriers of the SC-TDMA modulator. This is important because it allows the pilot symbols of different users to be orthogonal in the frequency domain. Furthermore, it allows the same CAZAC sequence to be reused by multiple users at different frequency offsets.

As shown in FIG. 3, this process is implemented by short CAZAC sequence generator 304, which generates pilot sequence 302. This process may be implemented by recalling complex samples of sequence 302 from data memory 314 (see FIG. 3). In other embodiments, short CAZAC sequence 302 may be generated using specially designed logic circuits, or by executing specially programmed software code (e.g., microcode in a microchip).

As discussed above, the CAZAC sequence has a constant magnitude, zero circular autocorrelation, flat frequency-domain response, and low cross-correlation between two sequences. In other embodiments, the pilot sequence may be implemented with a GCL sequence having similar characteristics.

The CAZAC pilot symbol has the properties of a CDMA signal in that it is able to average interference because of its superior correlation properties. In addition, the signal has the benefits of frequency domain orthogonality. This means that the same CAZAC sequence can be reused on different frequency sets of M subcarriers by different users. Thus, the same CAZAC sequence can be used to estimate different user's channels.

Next, the process converts the M-point CAZAC pilot sequence to an M-point parallel pilot sequence, as illustrated at block 506. This process may be implemented by a serial-to-parallel converter, such as serial-to-parallel converter 114 in FIG. 1.

After converting the pilot sequence to parallel data, the process performs an M-point discrete Fourier transform to produce an M-point parallel transform sequence, as illustrated at block 508. This process may be implemented in the M-point discrete Fourier transform block 304 in FIG. 3. The M-point parallel transform sequence is a frequency-domain representation of the time-domain modulation of the pilot sequence.

After transforming to the frequency-domain, the process distributes the M-point parallel transform sequence to a selected set of M subcarriers among N subcarriers, as depicted at block 510. In this distribution process, N is the number of subcarriers transmitted in the OFDM signal, and N is greater than M. The M selected subcarriers are evenly spaced apart, as represented in FIGS. 6 and 7. In one embodiment, this distribution process is implemented in distributed subcarrier mapper 308 shown in FIG. 3. Note that the N subcarriers that have not been selected in the set of M subcarriers will have their values set to zero.

As shown in FIGS. 6 and 7, different sets of M subcarriers may be selected among the N subcarriers while still maintaining even carrier spacing in the group of N subcarriers. In FIG. 6 for example, a first subcarrier 602, labeled $SC_0$ is selected, and every fourth subcarrier 604 is selected among a group of sixteen subcarriers 600, $SC_0$-$SC_{15}$. These selected subcarriers 602, 604 may represent a first group or set of selected subcarriers having a carrier spacing 606. Similarly, FIG. 7 shows the selection of a second set of subcarriers 702, 704, beginning with the second subcarrier 702, $SC_1$, and every fourth subcarrier 704 thereafter. In FIG. 7, the carrier spacing 606 remains at four carriers apart. In practice, N will probably be much larger than sixteen. In one embodiment, N is equal to 512, and M is equal to 37. Different sets of subcarriers may be selected in alternate frames of pilots symbols. Information specifying which set of selected subcarriers is used should be known in advance in the receiver for proper demodulation. Such information may be known by communicating the selected set in advance through a control message, or by agreeing upon a known sequence of sets beginning at a selected time.

Next, after distribution, the process performs an N-point inverse fast Fourier transform (IFFT) to convert the N-point frequency-domain sequence to an N-point time-domain sequence, as illustrated at block 512. This process is implemented using N-point IFFT block 312 in FIG. 3. The IFFT converts the mapped set of M-points in the parallel transform sequence, and the zero values for the non-selected subcarriers, to an N-point distributed mode time-domain sequence.

Next, the process converts the N-point time-domain sequence to a serial sequence, as illustrated at block 514. Then, at block 516, the process adds a cyclic prefix to the serial sequence. The purpose of adding the cyclic prefixes to reduce inter symbol interference. This process is implemented by copying a number of complex samples from the end of the serial sequence to the beginning of the serial sequence, as is known in the art of OFDM modulation. In one embodiment, the number of complex samples copied is equal to 32.

Finally, the process of generating a pilot symbol in an OFDM transmitter ends at block 518. It should be apparent that while the process of generating a pilot signal ends at block 518, the process depicted may be repeated as necessary to provide multiple pilot symbols as dictated by the requirements of the particular system in which the process is used.

Figure 8:
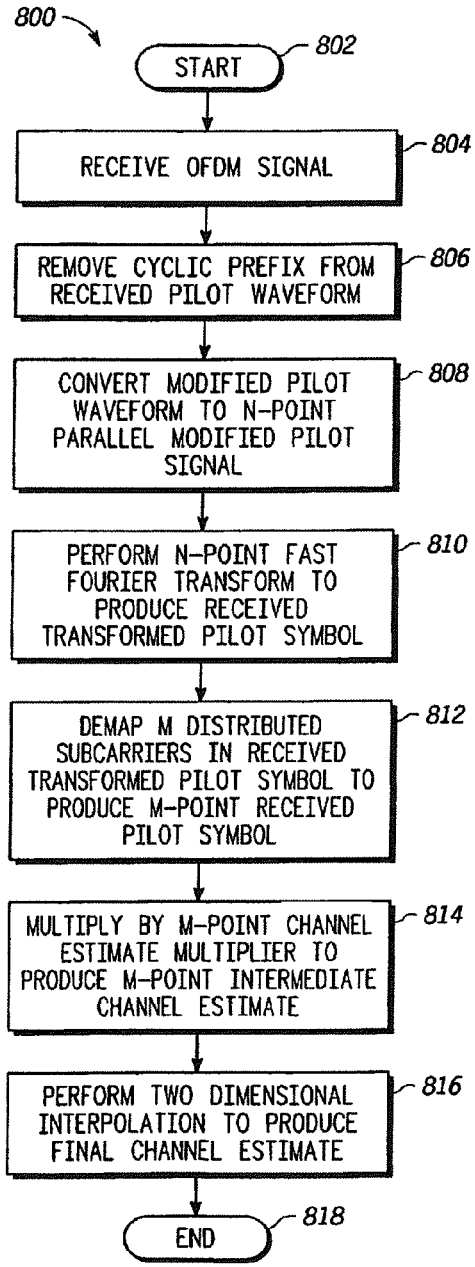
FIG. 8 is a high-level flowchart of processes executed by the SC-SDMA receiver of FIGS. 2 and 4 in accordance with one or more embodiments.

Referring now to FIG. 8, there is depicted a high-level flowchart 800 of exemplary processes executed by portions of a receiver, such as receiver 400, which is shown in the system of FIGS. 2 and 4, or other similar apparatus, in accordance with one or more embodiments. As illustrated, the process begins at Nock 802, and thereafter passes to block 804 wherein the process receives the OFDM signal. This process of receiving the OFDM signal includes downconverting the received signal and converting the down converted analog waveform to digital samples. As shown in FIG. 2, receiving the OFDM signal is implemented in downconverter and A/D converter 206, which produces received waveform 402 shown in FIG. 4. Note that the received signal 204 is equal to the transmitted signal 126 multiplied by the transfer function of the channel.

Next, the process removes the cyclic prefix from the received pilot waveform to produce a modified pilot waveform, as depicted at block 806. Removing the cyclic prefix is implemented in the cyclic prefix remover block 404 shown in FIG. 4. After removing the cyclic prefix, the process converts the serial modified pilot waveform into an N-point parallel modified pilot symbol, as illustrated at block 808.

Next, the process performs an N-point fast Fourier transform on the N-point parallel modified pilot symbol to produce a received transformed pilot symbol, as depicted at block 810. This process converts a signal in the time-domain to a signal in the frequency-domain.

After the fast Fourier transform, the process de-maps M distributed subcarriers in the received transformed pilot symbol to produce an M-point received signal as illustrated at block 812. This process may be implemented using distributed subcarrier de-mapper 416 in FIG. 4.

Next, the process multiplies the M-Point received pilot symbol by an M-point channel estimate multiplier to produce an M-point intermediate channel estimate, as depicted at block 814. The M-point channel estimate multiplier is derived from the transmitted pilot symbol, and is a Fourier transformed time-reversed conjugate sequence of the transmitted pilot symbol.

After multiplying, the process performs a two dimensional interpolation to produce a final channel estimate, as illustrated at block 816. In one embodiment, the two dimensional interpolation is performed using 2D interpolator 428 in FIG. 4.

Finally, the process of receiving and using a pilot symbol in an OFDM receiver ends at block 818. It should be apparent that while the processing of the pilot signal ends at block 818, the process depicted may be repeated as necessary to receive and process multiple pilot symbols as dictated by the requirements of the particular system in which the process is used.

Figure 9:
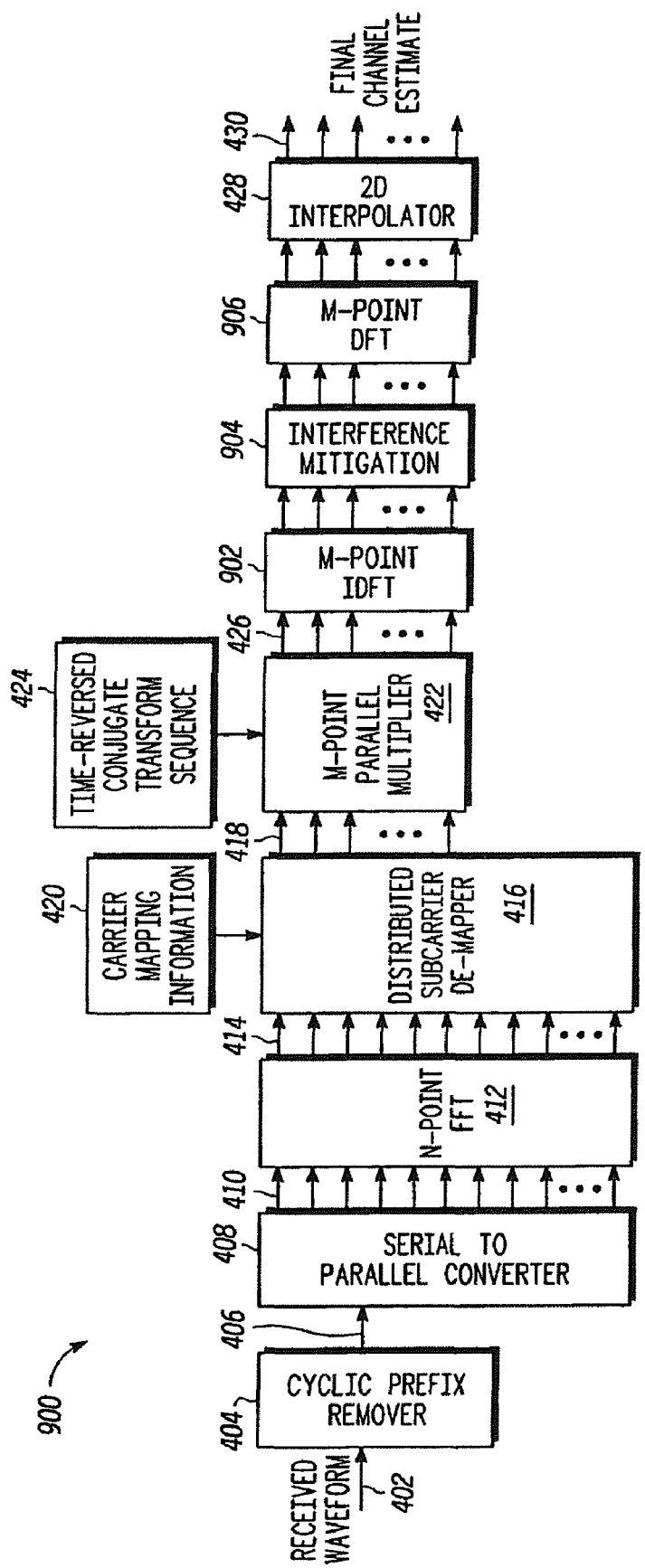
FIG. 9 shows an alternative high-level representative block diagram of portions of the SC-SDMA receiver of FIG. 2 in accordance with one or more embodiments.

With reference now to FIG. 9, there is depicted high-level representative block diagram of an alternate embodiment of portions 900 of the SC-SDMA receiver 200 of FIG. 2 in accordance with one or more embodiments. The functional blocks comprising receiver 900 are similar to those of receiver 200, except for the addition of the following functional blocks: M-point inverse discrete Fourier transform (IDFT) 902, interference mitigation 904, and M.-point DFT 906. The purpose of the IDFT is to convert the pilot signal into the time domain where additional processing and optimization can be performed to mitigate interference and multipath. This produces a refined time-domain channel estimate. The refined time-domain channel estimate must then be transformed back into the frequency domain for interpolation.

The above described functions and structures can be implemented in one or more integrated circuits. For example, many or all of the functions can be implemented in the signal processing circuitry that is suggested by the block diagrams shown in FIGS. 1-4 and 9.

The processes, apparatus, and systems, discussed above, and the inventive principles thereof are intended to produce an improved and more efficient pilot symbol in an SC-FDMA transmitter and receiver system by combining CDMA and FDMA pilot signals. By using a generalized chirp like (GCL) sequence—such as the CAZAC sequence—for the pilot signal, the peak to average ratio of the transmitted signal can be lowered, and the characteristics of the channel may be estimated more accurately because the pilot signal has a constant amplitude in the frequency-domain, which is better suited for channel estimation. When a CAZAC sequence is inserted in an FDMA manner for the pilot channel, the receiver may use interference averaging techniques to receive the pilot signal without sacrificing the link benefits of FDMA pilots These significant improvements can be made with relatively low cost and minimal added complexity.

While the embodiments discussed above primarily relate to transmitting a radio frequency signal in a wireless communications system, this system for generating a pilot symbol, and processes therein, may be used in other data transmission applications, such as transmitting data via a wireline media, such as a wideband coaxial cable, twisted-pair telephone wire, or the like.

This disclosure is intended to explain how to fashion and use various embodiments in accordance with the invention, rather than to limit the true, intended, and fair scope and spirit thereof. The foregoing description is not intended to be exhaustive or to limit the invention to the precise form disclosed. Modifications or variations are possible in light of the above teachings. The embodiment(s) were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for generating a transmit sequence in a single carrier frequency division multiple access (SC-FDMA) transmitter, comprising:
   generating a first time domain sequence, the first time domain sequence having a constant amplitude and zero autocorrelation properties;
   transforming the first time domain sequence to a first frequency domain sequence according to a first transform;
   distributing the first frequency domain sequence among a subset of subcarriers among a plurality of subcarriers in a second frequency domain sequence;
   transforming the second frequency domain sequence to a second time domain sequence according to a second transform; and
   adding a cyclic prefix to the second time domain sequence to form a transmit sequence.

2. The method for generating a transmit sequence according to claim 1, further comprising transmitting the transmit sequence.

3. The method for generating a transmit sequence according to claim 1, wherein the first transform comprises an M-point discrete Fourier transform.

4. The method for generating a transmit sequence according to claim 1, wherein the second transform comprises an N-point discrete inverse Fourier transform.

5. The method for generating a transmit sequence according to claim 3, wherein the second transform comprises an N-point discrete inverse Fourier transform.

6. The method for generating a transmit sequence according to claim 1, wherein the first time domain sequence comprises a constant-amplitude zero-autocorrelation (CAZAC) sequence.

7. The method for generating a transmit sequence according to claim 1, wherein the first time domain sequence comprises a Zadoff-Chu sequence.

8. The method for generating a transmit sequence according to claim 1, wherein the subset of subcarriers is distributed evenly throughout the plurality of subcarriers.

9. The method for generating a transmit sequence according to claim 8, wherein the subset of subcarriers changes between successive transmissions of the transmit sequence.

10. A single carrier frequency division multiple access (SC-FDMA) transmitter, comprising:
    a wireless interface, the wireless interface configured to communicate with a wireless communications device, the wireless interface comprising:
    a first transform module configured to transform a first time domain pilot sequence to a first frequency domain pilot sequence;
    a distribution module configured to distribute the first frequency domain pilot sequence among a subset of a plurality of subcarriers in a second frequency domain sequence;
    a second transform module configured to transform the second frequency domain sequence to a second time domain sequence;

a prefix module, configured to add a cyclic prefix to the second time domain sequence to form a transmit sequence;

a processor; and a computer readable apparatus having a storage medium with at least one computer program stored thereon, the at least one computer program configured to, when executed on the processor:
generate the first time domain pilot sequence, the first time domain sequence having a constant amplitude and zero autocorrelation properties; and
cause one or more transmissions of the transmit sequence.

11. The SC-FDMA transmitter of claim 10, wherein the first transform module is configured to execute an M-point discrete Fourier transform.

12. The SC-FDMA transmitter of claim 10, wherein the second transform module is configured to execute an N-point discrete inverse Fourier transform.

13. The SC-FDMA transmitter of claim 10, wherein the subset of subcarriers is selected according to a predetermined scheme shared with a receiver.

14. The SC-FDMA transmitter of claim 13, wherein the transmitter is configured to share the predetermined scheme with the receiver via a control message.

15. The SC-FDMA transmitter of claim 13, wherein the subset of subcarriers is distributed evenly throughout the plurality of subcarriers.

16. The SC-FDMA transmitter of claim 13, wherein the scheme comprises changing the subset of subcarriers between successive transmissions of the transmit sequence.

17. A method of incorporating one or more pilot symbols for use within an Orthogonal Frequency Division Multiplexing (OFDM) system, comprising:
generating a pilot symbol sequence, the pilot symbol sequence having one or more predefined characteristics;
transforming the pilot symbol sequence to a first frequency domain sequence according to a Fourier Transform;
distributing the first frequency domain sequence among a first subset of a plurality of subcarriers in a second frequency domain sequence;
distributing a frequency domain data sequence comprising user data among a second subset of subcarriers among the plurality of subcarriers in the second frequency domain sequence;
transforming the second frequency domain sequence to a second time domain sequence according to an Inverse Fourier Transform;
adding a cyclic prefix to the second time domain sequence to form a transmit sequence; and
transmitting the transmit sequence.

18. The method of claim 17, wherein at least one of the one or more predefined characteristics of the pilot symbol sequence comprises a constant magnitude property.

19. The method of claim 17, wherein at least one of the one or more predefined characteristics of the pilot symbol sequence comprises a zero circular auto correlation property.

20. The method of claim 17, wherein at least one of the one or more predefined characteristics of the pilot symbol sequence comprises a flat frequency domain response property.

21. The method of claim 17, wherein at least one of the one or more predefined characteristics of the pilot symbol sequence comprises a low and constant magnitude result when circularly cross-correlated with another sequence.

22. The method of claim 17, wherein the pilot symbol sequence comprises a Zadoff-Chu sequence.

23. The method of claim 17, where the frequency domain data sequence additionally comprises control signaling.

24. A single carrier frequency division multiple access (SC-FDMA) transmitter, comprising:
a wireless interface comprising:
first apparatus configured to generate a first time domain sequence, the first time domain sequence having a constant amplitude and zero autocorrelation properties; and
second apparatus configured to transform the first time domain sequence to a first frequency domain sequence;
third apparatus configured to distribute the first frequency domain sequence among a subset of a plurality of subcarriers in a second frequency domain sequence;
fourth apparatus configured to transform the second frequency domain sequence to a second time domain sequence; and
fifth apparatus configured to add a cyclic prefix to the second time domain sequence to form a transmit sequence for transmission over the wireless interface.

25. The SC-FDMA transmitter of claim 24, wherein the second apparatus is configured to execute an M-point discrete Fourier transform.

26. The SC-FDMA transmitter of claim 24, wherein the fourth apparatus is configured to execute an N-point discrete inverse Fourier transform.

27. The SC-FDMA transmitter of claim 24, wherein the subset of the plurality of subcarriers is selected according to a predetermined scheme shared with a receiver.

28. The SC-FDMA transmitter of claim 27, wherein the transmitter is configured to share the predetermined scheme with the receiver via a control message.

29. The SC-FDMA transmitter of claim 27, wherein the subset of subcarriers is distributed evenly throughout the plurality of subcarriers.

30. The SC-FDMA transmitter of claim 27, wherein the scheme comprises changing the subset of subcarriers between successive transmissions of the transmit sequence.

31. Wireless Orthogonal Frequency Division Multiplexing (OFDM) apparatus, comprising:
first apparatus configured to generate a pilot symbol sequence, the pilot symbol sequence having one or more predefined characteristics;
second apparatus configured to transform the pilot symbol sequence into a first frequency domain sequence according to a Fourier Transform;
third apparatus configured to distribute the first frequency domain sequence among a first subset of a plurality of subcarriers in a second frequency domain sequence;
fourth apparatus configured to distribute a frequency domain data sequence comprising user data among a second subset of subcarriers among the plurality of subcarriers in the second frequency domain sequence;
fifth apparatus configured to transform the second frequency domain sequence into a second time domain sequence according to an Inverse Fourier Transform; and
sixth apparatus configured to add a cyclic prefix to the second time domain sequence to form a transmit sequence.

* * * * *